US011003890B2

(12) United States Patent
Zhang et al.

(10) Patent No.: US 11,003,890 B2
(45) Date of Patent: May 11, 2021

(54) METHOD AND APPARATUS FOR FACIAL AGE IDENTIFICATION, AND ELECTRONIC DEVICE

(71) Applicant: BEIJING SENSETIME TECHNOLOGY DEVELOPMENT CO., LTD, Beijing (CN)

(72) Inventors: Yunxuan Zhang, Beijing (CN); Cheng Li, Beijing (CN)

(73) Assignee: BEIJING SENSETIME TECHNOLOGY DEVELOPMENT CO., LTD, Beijing (CN)

(*) Notice: Subject to any disclaimer, the term of this patent is extended or adjusted under 35 U.S.C. 154(b) by 160 days.

(21) Appl. No.: 16/236,292

(22) Filed: Dec. 28, 2018

(65) Prior Publication Data
US 2019/0138787 A1 May 9, 2019

Related U.S. Application Data

(63) Continuation of application No. PCT/CN2018/098665, filed on Aug. 3, 2018.

(30) Foreign Application Priority Data

Aug. 11, 2017 (CN) .......................... 201710687587.1
Feb. 9, 2018 (CN) .......................... 201810136268.6

(51) Int. Cl.
G06K 9/00 (2006.01)
G06K 9/62 (2006.01)
(Continued)

(52) U.S. Cl.
CPC ....... *G06K 9/00221* (2013.01); *G06K 9/6255* (2013.01); *G06K 9/6274* (2013.01);
(Continued)

(58) Field of Classification Search
None
See application file for complete search history.

(56) References Cited

U.S. PATENT DOCUMENTS 9,311,564 B2 4/2016 Savvides et al.
9,514,356 B2* 12/2016 Lu ..................... G06K 9/00268
(Continued)

FOREIGN PATENT DOCUMENTS

CN 102567719 A 7/2012
CN 106384080 A 2/2017

OTHER PUBLICATIONS

CN 105718898 machine translation; Applicants Southeast University Inventors :Geng Xin and Yang Xu (Year: 2016).*
(Continued)

*Primary Examiner* — Nancy Bitar
(74) *Attorney, Agent, or Firm* — Syncoda LLC; Feng Ma

(57) ABSTRACT

A method and an apparatus for facial age identification, an electronic device, and a computer readable medium include: obtaining estimated facial age of a person in an image to be identified; selecting N image samples from an image sample set of known age according to the estimated facial age and age of two or more preset age gaps with the estimated facial age, the N being not less than 2; obtaining a comparison result of ages between the image to be identified and the selected N image samples; and obtaining probability information for determining a person's facial age attribute information according to statistical information formed by the comparison result.

20 Claims, 12 Drawing Sheets

(51) Int. Cl.
*G06N 3/04* (2006.01)
*G06N 3/08* (2006.01)

(52) U.S. Cl.
CPC ......... *G06K 9/6277* (2013.01); *G06N 3/0481* (2013.01); *G06N 3/08* (2013.01); *G06K 2009/00322* (2013.01)

(56) References Cited

U.S. PATENT DOCUMENTS

| | | | | |
|---|---|---|---|---|
| 10,115,208 | B2* | 10/2018 | Ouyang | G06K 9/00362 |
| 10,401,860 | B2* | 9/2019 | Krupat | G10L 25/63 |
| 2014/0099029 | A1* | 4/2014 | Savvides | G06K 9/00221 |
| | | | | 382/197 |
| 2014/0226896 | A1* | 8/2014 | Imai | G06K 9/6247 |
| | | | | 382/154 |
| 2015/0195216 | A1* | 7/2015 | Di Pietro | H04L 41/5025 |
| | | | | 370/252 |
| 2015/0359483 | A1* | 12/2015 | Rosa | A61B 5/0077 |
| | | | | 600/301 |
| 2016/0070956 | A1* | 3/2016 | Lu | G06K 9/00268 |
| | | | | 382/118 |
| 2016/0379082 | A1* | 12/2016 | Rodriguez | G06K 9/62 |
| | | | | 382/100 |
| 2018/0144193 | A1* | 5/2018 | Tang | G06K 9/00275 |
| 2020/0134295 | A1* | 4/2020 | el Kaliouby | G06K 9/00597 |

OTHER PUBLICATIONS

International Search Report in the international application No. PCT/CN2018/098665, dated Oct. 31, 2018.

Zhang, Yunxuan et al. "Quantifying Facial Ageby Posterior of Age Comparisons." Cornell University Library[online]., Oct. 13, 2017 (Oct. 13, 2017), [retrieved on Aug. 14, 2018]. Searched on the Internet <URL:http://cn.arxiv.org/pdf/I 708.09687v2>.

Liang Du, "Cross-Age Face Verification by Coordinating with Cross-Face Age Verification"; Proc of the IEEE Computer Society; Dec. 31, 2015.

First Office Action of the Chinese application No. 201810136268.6, dated Jan. 2, 2020.

English translation of the Written Opinion of the International Search Authority in the international application No. PCT/CN2018/098665, dated Oct. 31, 2018.

* cited by examiner

METHOD AND APPARATUS FOR FACIAL AGE IDENTIFICATION, AND ELECTRONIC DEVICE

CROSS-REFERENCE TO RELATED APPLICATIONS

This is a continuation of International Patent Application No. PCT/CN2018/098665 filed on Aug. 3, 2018, which claims priority to Chinese Patent Application No. CN201710687587.1 filed on Aug. 11, 2017 and Chinese Patent Application No. CN201810136268.6 filed on Feb. 9, 2018. The disclosures of these applications are hereby incorporated by reference in their entirety.

BACKGROUND

Face attribute information identification is information that identifies the gender, age, expression, and race, etc. presented by a person's face in an image.

Face attribute information identification is a research topic in the field of computer visions, and identification of facial age in an image is an important branch in face attribute information identification.

SUMMARY

The present disclosure relates to the computer vision technologies, and in particular, to a method and a device for facial age identification, a non-transitory computer readable storage medium and an electronic device.

Embodiments of the present disclosure provide technical solutions for facial age identification.

A method for facial age identification provided according to one aspect of the embodiments of the present disclosure includes: obtaining estimated facial age of a person in an image to be identified; selecting N image samples from an image sample set of known age according to the estimated facial age and age of two or more preset age gaps with the estimated facial age, the N being not less than 2; obtaining a comparison result of ages between the image to be identified and the selected N image samples; and obtaining probability information for determining a person's facial age attribute information according to statistical information formed by the comparison result.

In an embodiment of the present disclosure, the obtaining probability information for determining a person's facial age attribute information according to statistical information formed by the comparison result includes: obtaining a first facial age posterior probability distribution according to a first preset facial age prior probability distribution and a first likelihood function formed based on the comparison result, where the facial age posterior probability distribution is configured to determine a person's facial age attribute information.

In another embodiment of the present disclosure, the obtaining estimated facial age of a person in an image to be identified includes:

inputting the image to be identified to a neural network model, and determining estimated facial age of the person in the image to be identified according to output information of the neural network model.

In still another embodiment of the present disclosure, the output information of the neural network model includes a second facial age posterior probability distribution.

In still another embodiment of the present disclosure, processing operations executed by the neural network model for the input image to be identified include:

obtaining a person's facial features in the image to be identified; determining, for at least one preset age category, the probability that the facial features are facial features exceeding the age category, the probability forming a likelihood value of a second likelihood function; and generating a second facial age posterior probability distribution according to a second preset facial age prior probability distribution and the second likelihood function formed based on the probability.

In still another embodiment of the present disclosure, the determining, for at least one preset age category, the probability that the facial features are facial features exceeding the age category includes: classifying the facial features by using a first fully connected layer for the at least one preset age category; and performing normalization processing on the classification result by using a sigmoid function to obtain the probability that the facial features are facial features exceeding the age category.

In still another embodiment of the present disclosure, the generating a second facial age posterior probability distribution according to a second preset facial age prior probability distribution and the second likelihood function formed based on the probability includes: calculating the second preset facial age prior probability distribution and the second likelihood function formed based on the probability according to the Bayes formula to generate the second facial age posterior probability distribution.

In still another embodiment of the present disclosure, the calculating the second preset facial age prior probability distribution and the second likelihood function formed based on the probability according to the Bayes formula to generate the second facial age posterior probability distribution includes: calculating the second preset facial age prior probability distribution and the second likelihood function formed based on the probability by using a second fully connected layer according to the logged Bayes formula; and restoring a calculation result output by the second fully connected layer to the second facial age posterior probability distribution by using a softmax function.

In still another embodiment of the present disclosure, the determining estimated facial age of a person in the image to be identified according to output information of the neural network model includes: determining a median of the second facial age posterior probability distribution, and using the median as the estimated facial age; or performing weighted calculation on the second facial age posterior probability distribution, and determining the estimated facial age according to the weighted calculation result; or using the age corresponding to the maximum probability in the second facial age posterior probability distribution as the estimated facial age; or performing confidence calculation on the second facial age posterior probability distribution, and determining an age range according to the confidence calculation result, and selecting an age from the age range as the estimated facial age.

In still another embodiment of the present disclosure, the training process of the neural network model includes: selecting M image samples of known facial age from the image sample set according to the known facial age of the input image sample and the facial age of two or more preset age gaps with the known facial age, the M being not less than 2; obtaining a comparison result of ages between the input image sample and the selected M image samples; obtaining a third facial age posterior probability distribution according to the second preset facial age prior probability distribution and a third likelihood function formed based on the comparison result; and performing supervised learning on the neural network model according to the third facial age posterior probability distribution.

In still another embodiment of the present disclosure, the training process further comprises: performing supervised learning on the neural network model according to the known facial age of the input image sample.

In still another embodiment of the present disclosure, the N sample images include N1 image samples with the age greater than the estimated facial age and N2 image samples with the age less than the estimated facial age, where the sum of N1 and N2 is N.

In still another embodiment of the present disclosure, when N is even, the N1 and N2 are equal, and for any one of the N1 image samples with the age greater than the estimated facial age, the N2 image samples with the age less than the estimated facial age have an image sample of age gaps having the same value and opposite sign.

In still another embodiment of the present disclosure, the obtaining a comparison result of ages between the image to be identified and the selected N image samples includes: obtaining the comparison result of ages between the image to be identified obtained in the form of receiving input information and the selected N image samples, where the input information includes a comparison result formed by manually comparing the ages between the image to be identified and the selected N image samples.

In still another embodiment of the present disclosure, the obtaining a first facial age posterior probability distribution according to a first preset facial age prior probability distribution and a first likelihood function formed based on the comparison result includes: calculating the first preset facial age prior probability distribution and the first likelihood function formed based on the comparison result according to the Bayes formula to generate the first facial age posterior probability distribution.

In still another embodiment of the present disclosure, the first facial age prior probability distribution includes a uniform probability distribution for at least one preset age category.

In still another embodiment of the present disclosure, the method further includes: filtering invalid first facial age posterior probability distribution, where the invalid first facial age posterior probability distribution includes: forming a first facial age posterior probability distribution of a downward parabolic shape.

In still another embodiment of the present disclosure, the method further includes: determining a person's facial age attribute information according to the first facial age posterior probability distribution; and labeling age attribute information of the image to be identified according to the facial age attribute information.

In still another embodiment of the present disclosure, the determining a person's facial age attribute information according to the first facial age posterior probability distribution includes: determining a median of the first facial age posterior probability distribution, and using the median as the facial age of the person in the image to be identified; or performing weighted calculation on the first facial age posterior probability distribution, and determining the facial age of the person in the image to be identified according to a weighted calculation result; or using the age corresponding to the maximum probability in the first facial age posterior probability distribution as the facial age of the person in the image to be identified; or performing confidence calculation on the second facial age posterior probability distribution, and determining an age range to which the facial age of the person in the image to be identified belongs according to a confidence calculation result.

In still another embodiment of the present disclosure, the slope of the first likelihood function and/or the second likelihood function is a numerical value between 0.1 and 0.6.

A method for facial age identification provided according to another aspect of the embodiments of the present disclosure is executed by a neural network model, and processing operations executed by the neural network model include: obtaining a person's facial features in an image to be identified; determining, for at least one preset age category, the probability that the facial features are facial features exceeding the age category, the probability forming a likelihood value of a second likelihood function; and generating a second facial age posterior probability distribution according to a second preset facial age prior probability distribution and the second likelihood function formed based on the probability.

In an embodiment of the present disclosure, the determining, for at least one preset age category, the probability that the facial features are facial features exceeding the age category includes: classifying the facial features by using a first fully connected layer for the at least one preset age category; and performing normalization processing on the classification result by using a sigmoid function to obtain the probability that the facial features are facial features exceeding the age category.

In another embodiment of the present disclosure, the generating a second facial age posterior probability distribution according to a second preset facial age prior probability distribution and the second likelihood function formed based on the probability includes: calculating the second preset facial age prior probability distribution and the second likelihood function formed based on the probability according to the Bayes formula to generate the second facial age posterior probability distribution.

In still another embodiment of the present disclosure, the calculating the second preset facial age prior probability distribution and the second likelihood function formed based on the probability according to the Bayes formula to generate the second facial age posterior probability distribution includes: calculating the second preset facial age prior probability distribution and the second likelihood function formed based on the probability by using a second fully connected layer according to the logged Bayes formula; and restoring a calculation result output by the second fully connected layer to the second facial age posterior probability distribution by using a softmax function.

In still another embodiment of the present disclosure, the training process of the neural network model includes: selecting M image samples of known facial age from the image sample set according to the known facial age of the input image sample and the facial age of two or more preset age gaps with the known facial age, the M being not less than 2; obtaining a comparison result of ages between the input image sample and the selected M image samples; obtaining a third facial age posterior probability distribution according to the second preset facial age prior probability distribution and a third likelihood function formed based on the comparison result; and performing supervised learning on the neural network model according to the third facial age posterior probability distribution.

In still another embodiment of the present disclosure, the training process further includes: filtering invalid third facial age posterior probability distribution; and the performing supervised learning on the neural network model according to the third facial age posterior probability distribution includes: performing supervised learning on the neural network model according to the filtered third facial age posterior probability distribution, where the invalid third facial age posterior probability distribution includes: forming a third facial age posterior probability distribution of a downward parabolic shape.

In still another embodiment of the present disclosure, the training process further comprises: performing supervised learning on the neural network model according to the known facial age of the input image sample.

An apparatus for facial age identification provided according to another aspect of the embodiments of the present disclosure includes: an estimated facial age obtaining module, configured to obtain estimated facial age of a person in an image to be identified; an image sample selecting module, configured to select N image samples from an image sample set of known age according to the estimated facial age and age of two or more preset age gaps with the estimated facial age, the N being not less than 2; a comparison result obtaining module, configured to obtain a comparison result of ages between the image to be identified and the selected N image samples; and a probability information generating module, configured to obtain probability information for determining a person's facial age attribute information according to statistical information formed by the comparison result.

In an embodiment of the present disclosure, the probability information generating module is configured to obtain a first facial age posterior probability distribution according to a first preset facial age prior probability distribution and a first likelihood function formed based on the comparison result; where the facial age posterior probability distribution is configured to determine a person's facial age attribute information.

In another embodiment of the present disclosure, the apparatus further includes: a first filtering module, configured to filter invalid first facial age posterior probability distribution, where the invalid first facial age posterior probability distribution includes: forming a first facial age posterior probability distribution of a downward parabolic shape.

In another embodiment of the present disclosure, the apparatus further includes: an age attribute determining module, configured to determine a person's facial age attribute information according to the first facial age posterior probability distribution; and a labeling module, configured to label age attribute information of the image to be identified according to the facial age attribute information.

An apparatus for facial age identification provided according to another aspect of the present disclosure is configured to implement a neural network model, and includes: a facial feature obtaining module, configured to obtain a person's facial features in an image to be identified; a probability determining module, configured to determine, for at least one preset age category, the probability that the facial features are facial features exceeding the age category, the probability forming a likelihood value of a second likelihood function; and a posterior probability distribution forming module, configured to generate a second facial age posterior probability distribution according to a second preset facial age prior probability distribution and the second likelihood function formed based on the probability.

In an embodiment of the present disclosure, the apparatus further includes a training module, configured to: select M image samples of known facial age from an image sample set according to the known facial age of an input image sample and the facial age of two or more preset age gaps with the known facial age, the M being not less than 2; obtain a comparison result of ages between the input image sample and the selected M image samples; obtain a third facial age posterior probability distribution according to the second preset facial age prior probability distribution and a third likelihood function formed based on the comparison result; and perform supervised learning on the neural network model according to the third facial age posterior probability distribution.

In another embodiment of the present disclosure, the apparatus further includes: a second filtering module, configured to filter invalid third facial age posterior probability distribution; and the training module is configured to perform supervised learning on the neural network model according to the filtered third facial age posterior probability distribution, where the invalid third facial age posterior probability distribution includes: forming a third facial age posterior probability distribution of a downward parabolic shape.

An electronic device provided according to another aspect of the embodiments of the present disclosure includes: a memory, configured to store a computer program; and a processor, configured to execute the computer program stored in the memory, where when the computer program is executed, the following instructions are run: an instruction for obtaining estimated facial age of a person in an image to be identified; an instruction for selecting N image samples from an image sample set of known age according to the estimated facial age and age of two or more preset age gaps with the estimated facial age, the N being not less than 2; an instruction for obtaining a comparison result of ages between the image to be identified and the selected N image samples; and an instruction for obtaining probability information for determining a person's facial age attribute information according to statistical information formed by the comparison result.

In an embodiment of the present disclosure, the instruction for obtaining probability information for determining a person's facial age attribute information according to statistical information formed by the comparison result includes: an instruction for obtaining a first facial age posterior probability distribution according to a first preset facial age prior probability distribution and a first likelihood function formed based on the comparison result, where the facial age posterior probability distribution is configured to determine the person's facial age attribute information.

In another embodiment of the present disclosure, the run instruction further includes: an instruction for filtering invalid first facial age posterior probability distribution, where the invalid first facial age posterior probability distribution includes: forming a first facial age posterior probability distribution of a downward parabolic shape.

In still another embodiment of the present disclosure, the run instruction further includes: an instruction for determining the person's facial age attribute information according to the first facial age posterior probability distribution; and an instruction for labeling age attribute information of the image to be identified according to the facial age attribute information.

An electronic device provided according to another aspect of the embodiments of the present disclosure includes: a memory, configured to store a computer program; and a processor, configured to execute the computer program stored in the memory, where when the computer program is executed, the following instructions are executed by a neural network model: an instruction for obtaining a person's facial features in an image to be identified; an instruction for determining, for at least one preset age category, the probability that the facial features are facial features exceeding the age category, the probability forming a likelihood value of a second likelihood function; and an instruction for generating a second facial age posterior probability distribution according to a second preset facial age prior probability distribution and the second likelihood function formed based on the probability.

In an embodiment of the present disclosure, when the computer program is executed, an instruction for training the neural network model is further executed, and the instruction for training the neural network model includes: an instruction for selecting M image samples of known facial age from an image sample set according to the known facial age of an input image sample and the facial age of two or more preset age gaps with the known facial age, the M being not less than 2; an instruction for obtaining a comparison result of ages between the input image sample and the selected M image samples; an instruction for obtaining a third facial age posterior probability distribution according to the second preset facial age prior probability distribution and a third likelihood function formed based on the comparison result; and an instruction for performing supervised learning on the neural network model according to the third facial age posterior probability distribution.

In an embodiment of the present disclosure, when the computer program is executed, the electronic device further executes: an instruction for filtering invalid third likelihood function formed based on the comparison result; the instruction for performing supervised learning on the neural network model according to the third facial age posterior probability distribution is: an instruction for performing supervised learning on the neural network model according to the filtered third facial age posterior probability distribution, where the invalid third likelihood function includes: forming a third likelihood function of a downward parabolic shape.

An electronic device provided according to another aspect of the embodiments of the present disclosure includes: a processor and the apparatus for facial age identification according to any one of the foregoing embodiments, where when the processor runs the apparatus for facial age identification, modules in the apparatus for facial age identification according to any one of the foregoing embodiments are run; or a processor and the apparatus for facial age identification according to any one of the foregoing embodiments, where when the processor runs the apparatus for facial age identification, modules in the apparatus for facial age identification according to any one of the foregoing embodiments are run.

A computer readable storage medium provided according to another aspect of the embodiments of the present disclosure has a computer program stored thereon, where the computer program is executed by a processor to implement the method for facial age identification according to any one of the foregoing embodiments, or the method for facial age identification according to any one of the foregoing embodiments.

A computer program provided according to another aspect of the embodiments of the present disclosure includes a computer readable code, where when the computer readable code runs in a device, a processor in the device executes instructions for implementing steps of the method for facial age identification according to any one of the foregoing embodiments; or when the computer readable code runs in a device, a processor in the device executes instructions for implementing steps of the method for facial age identification according to any one of the foregoing embodiments.

Based on the method for facial age identification, the apparatus for facial age identification, the electronic device and the computer storage medium, the present disclosure selects, by using estimated facial age of a person in an image to be identified (e.g., an image to be labeled), an image sample of a certain age gap with the estimated facial age, and obtains a comparison result of ages between the image to be identified and each image sample. Since statistical information formed by the age comparison result is an objective statistical result, the facial age attribute information can be objectively and reasonably deduced by using the statistical information. More specifically, the age comparison result and the age gap between the estimated facial age of the person in the image to be identified and the selected image sample conform to a likelihood function (e.g., a logistic function). Therefore, the present disclosure can form the likelihood function with the age comparison result, so that the present disclosure can form a facial age posterior probability distribution with the likelihood function and the facial age prior probability distribution by using the total probability formula, and thus the present disclosure can objectively and reasonably deduce the facial age attribute information such as the facial age of the person in the image to be identified or the age group to which the facial age belongs based on the facial age posterior probability distribution.

The technical solutions of the present disclosure are further described in detail below with reference to the accompanying drawings and the embodiments.

BRIEF DESCRIPTION OF DRAWINGS

The accompanying drawings constituting a part of the specification are used for describing embodiments of the present disclosure, and are intended to explain the principles of the present disclosure together with the descriptions.

According to the following detailed descriptions, the present disclosure can be understood more clearly with reference to the accompanying drawings.

DETAILED DESCRIPTION

Figure 1:
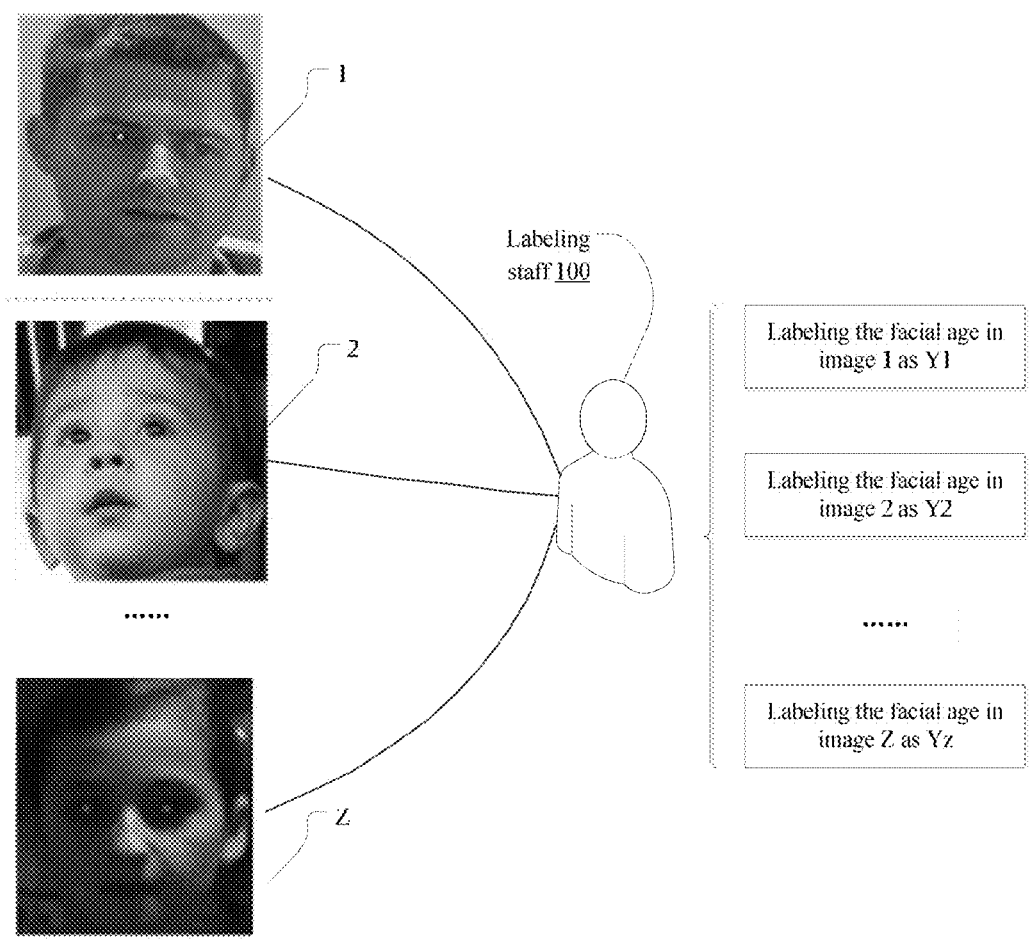
FIG. 1 is a schematic diagram of an application scenario of the present disclosure.

Various exemplary embodiments of the present disclosure are now described in detail with reference to the accompanying drawings. It should be noted that, unless otherwise stated specifically, relative arrangement of the components and steps, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the is applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

Embodiments of the present disclosure may be applied to computer systems/servers, which may operate with numerous other general-purpose or special-purpose computing system environments or configurations. Examples of well-known computing systems, environments, and/or configurations suitable for use together with the computer systems/servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, etc.

The computer systems/servers may be described in the general context of computer system executable instructions (for example, program modules) executed by the computer system. Generally, the program modules may include routines, programs, target programs, components, logics, data structures, etc. to execute specific tasks or implement specific abstract data types. The computer systems/servers may be practiced in the distributed cloud computing environments in which tasks are executed by remote processing devices that are linked through a communications network. In the distributed computing environments, program modules may be located in local or remote computing system storage media including storage devices.

First, referring to FIG. 1, an application scenario which may be implemented according to an embodiment of the present disclosure is schematically shown.

In FIG. 1, image 1, image 2, . . . , and image Z are images with age unknown in an image set, and image 1, image 2, . . . , and image Z are images containing faces, the faces in the images may be positive faces, or may be deflected by at least one angle. In addition, there is also a certain difference in the clarity of the faces in the images. The labeling staff 100 needs to separately label the facial age on image 1, image 2, . . . , and image Z, so that image 1, image 2, . . . , and image Z in the image set are images labeled with facial age information, respectively, for example, the labeling staff labels the facial age in image 1 as Y1, the facial age in image 2 as Y2, and the facial age in image Z as Yz.

Figure 2:
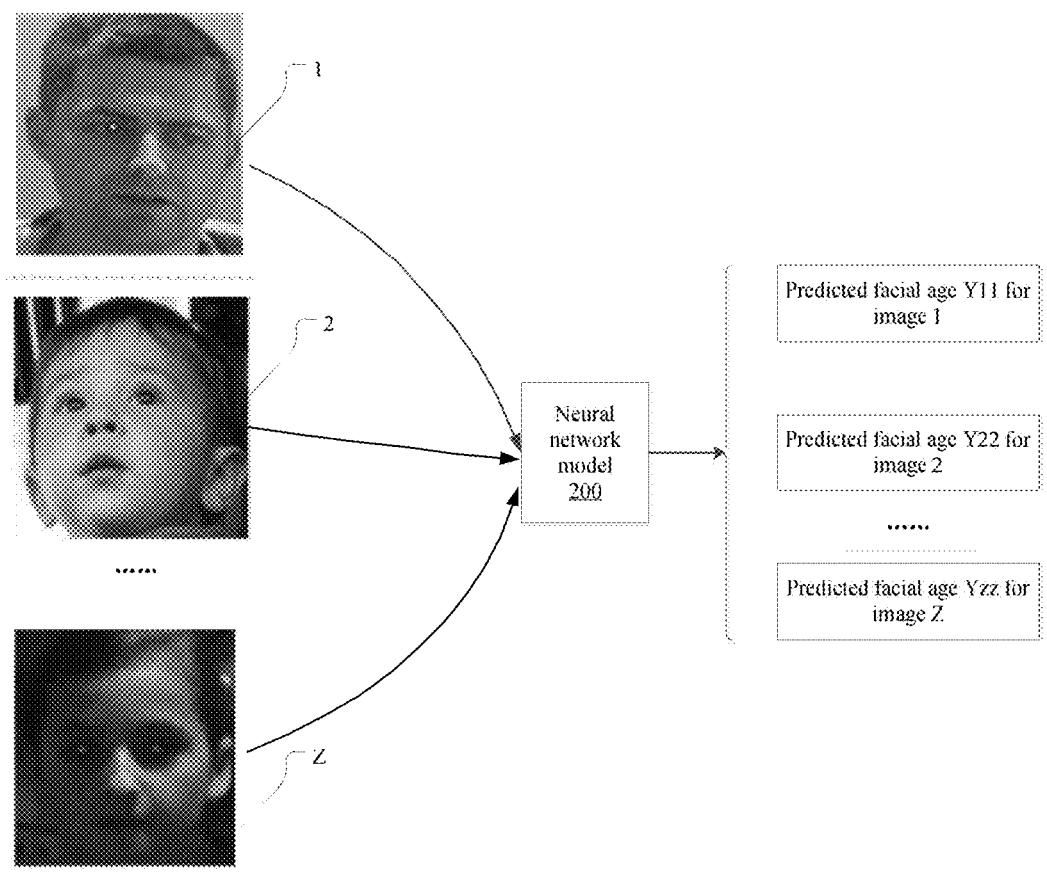
FIG. 2 is a schematic diagram of another application scenario of the present disclosure.

Then referring to FIG. 2, another application scenario which may be implemented according to an embodiment of the present disclosure is schematically shown.

In FIG. 2, image 1, image 2, . . . , and image Z are images with age unknown in an image set, and image 1, image 2, . . . , and image Z are images containing faces, the faces in the images may be positive faces, or may be deflected by at least one angle. In addition, there is also a certain difference in the clarity of the faces in the images. Facial age prediction for image 1, image 2, . . . , and image Z can be implemented through a pre-trained neural network model 200, i.e., facial ages respectively corresponding to image 1, image 2, . . . , and image Z are predicted according to output information of the neural network model 200, e.g., image 1, image 2, . . . , and image Z are separately input in the neural network model 200; and predicted facial age Y11 corresponding to image 1, predicted facial age Y22 corresponding to image 2, . . . , and predicted facial age Yzz corresponding to image Z can be obtained by processing the information output by the neural network model 200.

However, persons skilled in the art can fully understand that the applicable scenarios of the embodiments of the present disclosure are not limited by any aspect of the framework.

If an image containing a face of a person is presented to any volunteer to determine the person's facial age in the image (i.e., the age exhibited by the face, and the person's facial age may also be called the age of the person for short), then the volunteer often determines the facial age by the facial features such as wrinkles on the forehead, corners of the mouth, and the corners of the eyes. Although there are many details that can be used to determine the facial age, factors such as subjective guessing of facial details, and image quality limitations, often lead to a larger difference between the estimated facial age of the volunteer and the actual facial age; and the facial age estimated by different volunteers sometimes varies greatly.

In an actual user survey, 1,000 images containing human faces are selected from an image sample set in advance, and each image is labeled with the actual facial age, i.e., the actual age of a person in the image is known, and 30 volunteers are invited to do the following two experiments.

Figure 3:
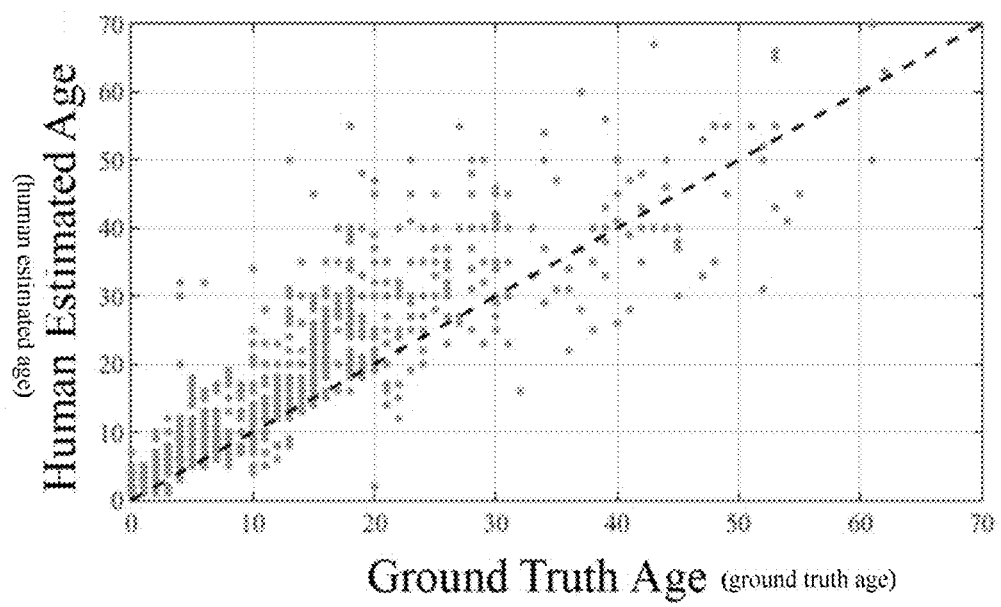
FIG. 3 is a statistical graph of identification results of facial ages of persons in artificially identified images.

Experiment a: 30 volunteers are invited to directly estimate facial ages of persons in 1,000 images, and the difference between the facial age respectively estimated by each volunteer and the actual facial age of the image is reflected in a two-dimensional coordinate graph as shown in FIG. 3. In the two-dimensional coordinate graph as shown in FIG. 3, the horizontal coordinate represents the actual age labeled for the image, and the vertical coordinate represents the facial age estimated by the volunteer.

It can be seen from FIG. 3 that there is a certain difference between the age directly estimated by the volunteer and the actual age, and some differences will reach 20-30 years old. If the images in the image sample set are subjected to facial age labeling by means of experiment a, the confidence level of the label information of the images in the image sample set may be greatly challenged; and if the age prediction is performed by means of experiment a, the accuracy of the prediction may be greatly challenged.

Figure 4:
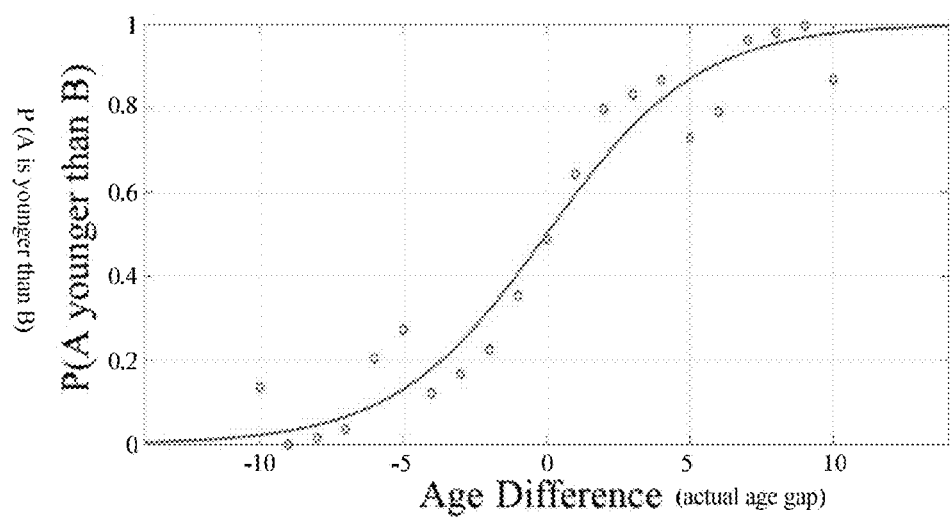
FIG. 4 is a block diagram for implementing an exemplary device according to an embodiment of the present disclosure.

Experiment b, two images are randomly selected from the 1,000 images each time, and 30 volunteers are invited to determine the person in which of the two images has a larger/smaller facial age. It can be summarized from the comparison results of all volunteers that the greater the difference between actual ages in the two images is, the higher the accuracy of judgment of the volunteers is; moreover, it can be obtained from further data mining and processing of the comparison results that the function relationship between the accuracy of judgment of the volunteers and the age gap of persons in the two images satisfies a logistic function, for example, the curve in FIG. 4 is a logistic function curve; moreover, dots in FIG. 4 are discrete points formed according to the determining results of the volunteers, and the logistic function, i.e., a likelihood function can be fit out according to all the discrete points.

According to the technical solutions for facial age identification provided by the present disclosure, an image sample corresponding to an age of a certain age gap with the estimated age is selected by using estimated age of an image to be identified (e.g., an image to be labeled), and a comparison result of ages between the image to be identified and each image sample is obtained. Since the age comparison result and the age gap between the estimated age of the image to be identified and the selected image sample conform to a likelihood function (e.g., a logistic function), the likelihood function can be formed with the age comparison result of the present disclosure, so that the present disclosure can form a facial age posterior probability distribution with the likelihood function and the facial age prior probability distribution by using the total probability formula, and thus the present disclosure can objectively and reasonably deduce the facial age attribute information such as the facial age of a person in the image to be identified or the age group to which the facial age belongs based on the facial age posterior probability distribution.

If such facial age attribute information is used to perform facial age labeling on the images in the image sample set, on the one hand, since it generally costs less time for the labeling staff to determine the person in which of the two images has an older/younger facial age relative to the fact that the labeling staff is required to directly estimate the person's facial age in the image, and on the other hand, it is generally more accurate for the labeling staff to determine the person in which of the two images has a larger/smaller facial age relative to the fact that the labeling staff directly estimates the person's facial age in the image, and therefore, the present disclosure is beneficial to improve the labeling efficiency, and increase the confidence level of the labeling information of images in the image sample set.

In addition, the present disclosure can use a neural network model to obtain a person's facial features in the image to be identified, and determine, for at least one preset age category (e.g., every integer age in 1-70 years old, and e.g., every integer age in 1-100 years old, etc.), the probability that the facial features are facial features exceeding the age category, and the neural network model can form a likelihood function with the obtained probability, and thus, the neural network model can generate a facial age posterior probability distribution by using the preset facial age prior probability distribution and the foregoing likelihood function. If the person's facial age in the image to be identified is determined by using such facial age posterior probability distribution, then age estimation based on the neural network model can be implemented, and it is beneficial to increase the accuracy of age estimation. Furthermore, if the facial age determined based on the neural network model is used as the estimated age in the foregoing labeling process, then the facial age determined based on the neural network model is generally more accurate. Therefore, the image sample selected from the image sample set and having a certain age gap with the image to be identified is generally closer to the objective situation, and thus it is beneficial to further improve the confidence level of the labeling information of the image in the image sample set.

Figure 5:
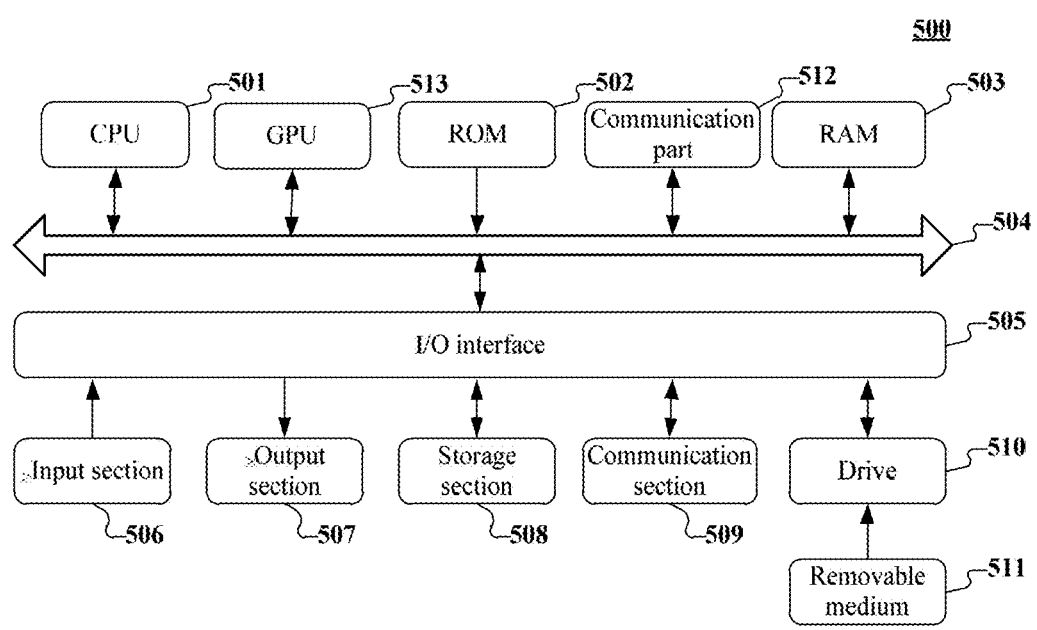
FIG. 5 is a flowchart of an embodiment of the method of the present disclosure.

FIG. 5 illustrates an exemplary device 500 applicable to implement the present disclosure. The device 500 may be a mobile terminal (e.g., a smart mobile phone, etc.), a Personal Computer (PC) (e.g., a desk computer or a notebook computer), a tablet computer, and a server, etc. In FIG. 5, the device 500 includes one or more processors, one or more communication parts, etc. The one or more processors may be one or more Central Processing Units (CPUs) 501, and/or one or more Graphic Processing Units (GPUs) 513, etc. The processor may perform various appropriate actions and processing according to executable instructions stored in a Read-Only Memory (ROM) 502 or executable instructions loaded from a storage section 508 to a Random-Access Memory (RAM) 503. The communication part 512 may include, but is not limited to, a network card. The network card may include, but is not limited to, an Infiniband (IB) network card. The processor may communicate with the ROM 502 and/or the RAM 503 to execute executable instructions. The processor is connected to the communication part 512 via a bus 504, and communicates with other target devices via the communication part 512, thereby completing corresponding steps in the present disclosure. In an optional example, steps executed by the processor include: obtaining estimated age of an image to be identified; selecting N image samples from an image sample set of known age according to the estimated age and age of two or more preset age gaps with the estimated age, the N being not less than 2; obtaining a comparison result of ages between the image to be identified and the selected N image samples; and obtaining probability information for determining a person's facial age attribute information according to statistical information formed by the comparison result. In another optional example, the processor executes corresponding processing operations for the input image to be identified by means of the neural network model, and the processing operations include: obtaining a person's facial features in the image to be identified; determining, for at least one preset age category, the probability that the facial features are facial features exceeding the age category, and the probability forming a likelihood value of a likelihood function; and generating a second facial age posterior probability distribution according to a second preset facial age prior probability distribution and the second likelihood function formed based on the likelihood value. The first facial age prior probability distribution in the present disclosure may refer to a probability value that the preset facial age belongs to at least one age category according to the prior knowledge before seeing the image to be identified.

In addition, the RAM 503 may further store various programs and data required during an operation of the apparatus. The CPU 501, the ROM 502, and the RAM 503 are connected to each other via the bus 504. In the presence of the RAM 503, the ROM 502 is an optional module. The RAM 503 stores executable instructions, or writes executable instructions to the ROM 502 during running. The executable instructions cause the CPU 501 to execute the steps included in the foregoing object segmenting method.

An Input/Output (I/O) interface 505 is also connected to the bus 504. The communication part 512 may be integrated, or may be set as having a plurality of sub-modules (for example, a plurality of IB network cards) respectively connected to the bus.

The following components are connected to the I/O interface 505: an input section 506 including a keyboard, a mouse, and the like; an output section 507 including a Cathode-Ray Tube (CRT), a Liquid Crystal Display (LCD), a speaker, etc.; the storage section 508 including a hard disk, etc.; and a communication section 509 of a network interface card including an LAN card, a modem, etc. The communication section 509 performs communication processing via a network such as the Internet. A drive 510 is also connected to the I/O interface 505 according to requirements. A removable medium 511 such as a magnetic disk, an optical disk, a magneto-optical disk, a semiconductor memory, etc. is mounted on the drive 510 according to requirements, so that a computer program read from the removable medium may be installed on the storage section 508 according to requirements.

It should be noted that, the architecture shown in FIG. 5 is merely an optional implementation. During specific practice, the number and the types of the components in FIG. 5 may be selected, decreased, increased, or replaced according to actual requirements. Different functional components may be separated or integrated or the like. For example, the GPU and the CPU may be separated, or the GPU may be integrated on the CPU, and the communication unit may be separated from or integrated on the CPU or the GPU or the like. These alternative implementations all fall within the protection scope of the present disclosure.

Particularly, the process described below with reference to the flowchart according to an embodiment of the present disclosure may be implemented as a computer software program. For example, an embodiment of the present disclosure includes a computer program product, including a computer program tangibly included in a machine-readable medium. The computer program includes a program code for executing the steps shown in the flowchart. The program code may include instructions for executing corresponding steps provided by the present disclosure. An optional example of instructions included by the program code is: an instruction for obtaining estimated age of an image to be identified; an instruction for selecting N image samples from an image sample set of known age according to the estimated age and age of two or more preset age gaps with the estimated age, the N being not less than 2; an instruction for obtaining a comparison result of ages between the image to be identified and the selected image samples; and an instruction for obtaining probability information for determining a person's facial age attribute information according to statistical information formed by the comparison result. Another optional example of instructions included by the program code is: an instruction for obtaining a person's facial features in an image to be identified; an instruction for determining, for at least one preset age category, the probability that the facial features are facial features exceeding the age category, the probability forming a likelihood value of a second likelihood function; and an instruction for generating a second facial age posterior probability distribution according to a second preset facial age prior probability distribution and the second likelihood function formed based on the probability.

In such embodiment, the computer program is downloaded and installed from the network through the communication section 509, and/or is installed from the removable medium 511. The computer program, when being executed by the CPU 501, executes the foregoing instructions recited in the present disclosure.

The technical solutions for facial age identification provided by the present disclosure may be implemented by an electronic device capable of running computer programs (also called as program codes) such as the smart mobile phone, the desk computer, the notebook computer, the tablet computer, or the server, and the computer program may be stored in a computer-readable storage medium such as a flash, a cache, a hard disk, or an optical disk, etc.

The technical solutions for facial age identification provided by the present disclosure are described below with reference to FIGS. 6-12.

Figure 6:
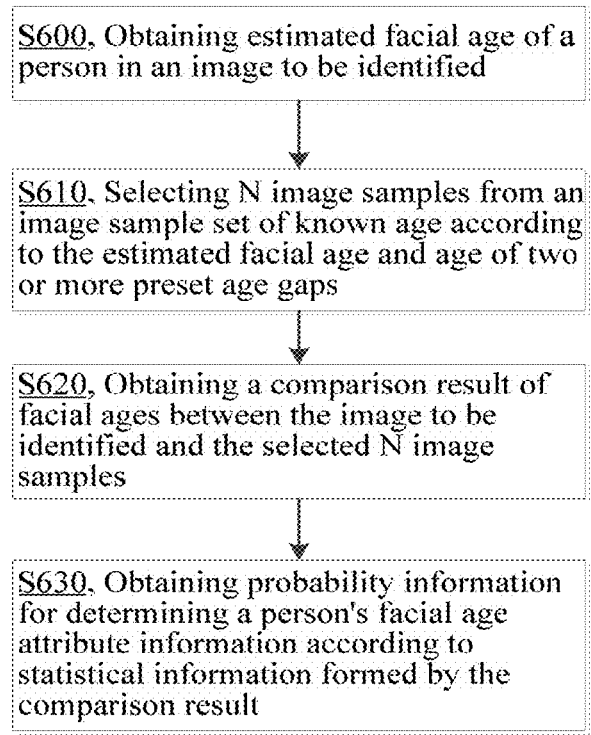
FIG. 6 is a flowchart of another embodiment of the method of the present disclosure.

In FIG. 6, S600, estimated age of an image to be identified is obtained.

In an optional example, step S600 may be executed by a processor by invoking an instruction stored in a memory for obtaining the estimated age of the image to be identified, or may be executed by an estimated age obtaining module 1100 run by the processor.

The image to be identified in the present disclosure may be a picture, a photo, or a video frame in a video, etc. The image to be identified should be an image containing a face, and the face in the image to be identified may be a positive face, or may be deflected by at least one angle. In addition, the clarity of face in the image to be identified may be very good, or may be defective to certain extent.

In an optional example, the estimated age of the image to be identified obtained by the estimated age obtaining module 1100 may be determined by using the existing estimated age mode, which is described below with two optional examples.

Example a, it is set that Y classifiers are provided in advance for 1-Y years old (e.g., 1-70 years old, or 1-80 years old, or 1-100 years old, etc.), and each classifier corresponds to an integer age in 1-Y years old (i.e., the $k^{th}$ classifier corresponds to k years old); the Y classifiers are used to respectively classify the images to be identified, each classifier would output a probability value, and the probability value output by any classifier is configured to represent the probability that the age of a person in the image to be identified is the age corresponding to the classifier, so that the estimated age obtaining module 1100 can obtain Y probabilities through Y classifiers, and the estimated age obtaining module 1100 can use the age corresponding to the maximum probability in the Y probabilities as the estimated age of the image to be identified.

Example b, it is set that Y classifiers are provided in advance for 1-Y years old (e.g., 1-70 years old, or 1-80 years old, or 1-100 years old, etc.), and each classifier corresponds to an integer age in 1-Y years old; the Y classifiers are used to respectively classify the images to be identified, each classifier outputs a probability value, and the probability value output by any classifier is configured to represent the probability that the age of a person in the image to be identified is larger than the age is corresponding to the classifier, so that the estimated age obtaining module 1100 can obtain Y probabilities through Y classifiers, and the estimated age obtaining module 1100 can perform summation on Y probabilities, and obtain the estimated age of the image to be identified according to the calculation result.

In an optional example, the estimated age obtaining module 1100 may also determine the estimated age of the image to be identified by using an estimated age mode that is different from the existing estimated age mode, for example, the estimated age obtaining module 1100 inputs the image to be identified as an input image to the neural network model of the present disclosure, and the estimated age obtaining module 1100 determines the estimated age of the image to be identified according to a facial age posterior probability distribution output by the neural network model. An optional example of the operations executed by the neural network model provided by the present disclosure is described in detail below.

Operation a, the neural network model in the present disclosure obtains a person's facial features in an image to be identified.

In an optional example, operation a may be executed by a processor by invoking an instruction stored in a memory for obtaining a person's facial features in the image to be identified, or may be executed by a facial feature obtaining module 1200 run by the processor.

In an optional example, the neural network model (e.g., the facial feature obtaining module 1200) may obtain the person's facial features in the image to be identified through a Convolutional Neural Network (CNN) contained therein, for example, the neural network model may obtain 128-dimensional facial features through the CNN (i.e., the facial feature obtaining module 1200 may be the CNN).

Operation b, for at least one preset age category, the obtained probability that the facial features are facial features exceeding the age category is determined, the probability is a likelihood value of a second likelihood function.

In an optional example, operation b may be executed by a processor by invoking an instruction stored in a memory for determining, for at least one preset age category, the probability that the facial features are facial features exceeding the age category, or may be executed by a probability determining module 1210 run by the processor.

In an optional example, the neural network model may classify, by using a first fully connected layer and a sigmoid function contained therein (i.e., the probability determining module 1210 may be the first fully connected layer and the sigmoid function), the facial features obtained by the facial feature obtaining module 1200 for at least one integer age in the preset age range, so as to obtain a probability value that a person in an image to be processed is older than at least one integer age, and the obtained probability value may form a likelihood value of at least one preset age of the person in the image to be processed; for example, regarding 0-70 years old, the neural network model can use the first fully connected layer and the sigmoid function to obtain a probability value that the person in the image to be processed is more than 0 year old, a probability value of more than 1 year old, a probability value of more than 2 years old, . . . , and a probability value of more than 70 years old, and the 70 probability values may form a 70-dimensional likelihood value.

Operation c, a second facial age posterior probability distribution is generated according to a second preset facial age prior probability distribution and the second likelihood function formed by the likelihood value obtained in operation b.

In an optional example, operation c in the present disclosure may be executed by a processor by invoking an instruction stored in a memory for generating a second facial age posterior probability distribution according to a second preset facial age prior probability distribution and the second likelihood function formed based on the probability, or may be executed by a posterior probability distribution forming module 1220 run by the processor.

In an optional example, the neural network model (e.g., the posterior probability distribution forming module 1220) may calculate the second preset facial age prior probability distribution and the second likelihood function by using the Bayes formula (e.g., the Bayes formula shown in formula (1) below), so that the neural network mode can generate the second facial age posterior probability distribution and output same. Optionally, the neural network mode may calculate the second preset facial age prior probability distribution and the second likelihood function formed by the foregoing likelihood value by using a second fully connected layer contained therein according to the logged Bayes formula (e.g., the formula (2) below), and perform, by using a softmax function, normalization processing on the calculation result output by the second fully connected layer to form the second preset facial age posterior probability distribution and output same; i.e., the second fully connected layer and the softmax function (i.e., the posterior probability distribution forming module 1220 may include the second fully connected layer and the softmax function) together implement the process of calculating the second preset facial age prior probability distribution and the second likelihood function according to the Bayes formula to obtain the facial age posterior probability distribution.

$$p(a \mid I) = p(a \mid E_k) = \frac{1}{Z} p(a) \prod_{k=1}^{K} p(E_k \mid a) = \qquad \text{formula (1)}$$

$$\frac{1}{Z} p(a) \prod_{k=1}^{K} p(E_k = 1 \mid a)^{f_k(I)} p(E_k = 0 \mid a)^{(1-f_k(I))}$$

$$\log P(a \mid I) = -\log Z + \log P(a) + \qquad \text{formula (2)}$$
$$\sum_{k} f_k(I) \log P(E_k = 1 \mid a) + (1 - f_k(I)) \log P(E_k = 0 \mid a)$$

In the foregoing formulas (1) and (2), both $p(\alpha|I)$ and $p(\alpha|E_k)$ represent a facial age posterior probability distribution of an image I to be identified based on age $\alpha$ (i.e., given age, or actual age, or known age); k is an integer age in the age range; K is the number of ages in the age range (e.g., 70, or 80, or 100, etc.), and K generally may also be the maximum age in the age range; $P(E_k|\alpha)$ represents a second likelihood function in the case of age $\alpha$ and age k; Z is a coefficient, e.g., $Z=P(E_k=0|\alpha)+P(E_k=1|\alpha)$; $P(\alpha)$ represents the preset facial age prior probability distribution, where the facial age prior probability distribution may be an uniform probability distribution for each age category in the age range, e.g., an uniform probability distribution for each integer age in 1-100 years old or 1-70 years old; $E_k=1$ represents that the facial age of the image to be identified is greater than k years old, and $E_k=0$ represents that the facial age of the image to be identified is less than k years old; $P(E_k=1|\alpha)$ represents the probability that the facial age of the image to be identified is greater than k years old; $P(E_k=0|\alpha)$ represents the probability that the facial age of the image to be identified is less than k years old; and $f_k(I)$ represents output information of the $k^{th}$ classifier for the image I to be identified, i.e., a likelihood value corresponding to the $k^{th}$ years old.

In an optional example, the slope of the second likelihood function in the present disclosure may be any numerical value between 0.1 and 0.6, for example, the slope of the second likelihood function is 0.36, and the slope of the second likelihood function decides the parameter of the second fully connected layer.

The estimated age obtaining module 1100 may adopt various existing implementation mode, and determines the estimated age of the image to be identified on the basis of a facial age posterior probability distribution output by the neural network model. In an optional example, the estimated age obtaining module 1100 determines a median of the facial age posterior probability distribution output by the neural network model, and uses the median as the person's predicted facial age. In another optional example, the estimated age obtaining module 1100 performs weighted calculation on the facial age posterior probability distribution output by the neural network model, and determines the predicted person's predicted facial age according to the weighted calculation result. In another optional example, the estimated age obtaining module 1100 uses the age corresponding to the maximum probability in the facial age posterior probability distribution output by the neural network model as the person's predicted facial age. In another optional example, the estimated age obtaining module 1100 performs confidence calculation on the facial age posterior probability distribution output by the neural network model, and determines the age range to which the person's predicted facial age belongs according to the confidence calculation result, and then the estimated age obtaining module 1100 may select one age from the age range as the estimated age, for example, the middle age in the age range is selected as the estimated age. The present disclosure does not limit the specific implementation that the estimated age obtaining module 1100 determines the estimated age of the image to be identified based on the facial age posterior probability distribution.

The training process of the neural network model in the present disclosure is recited in the training embodiment below.

S610, N image samples are selected from an image sample set of known age according to the estimated age and age of two or more preset age gaps with the estimated age.

In an optional example, step S610 may be executed by a processor by invoking an instruction stored in a memory for obtaining the image sample from the image sample set, or may be executed by an image sample selecting module 1110 run by the processor.

In an optional example, the image sample set of the present disclosure is provided with multiple image samples; in general, each image sample should contain a face, and the faces in the image samples may be positive faces, or may be deflected by at least one angle. In addition, the clarity of face in the image sample may be very good, or may be defective to certain extent. Moreover, at least one image sample in the image sample set is generally an image sample of known age, for example, the image samples in the image sample set are generally labeled with the actual ages. The number of image samples selected from the image sample set by the image sample selecting module 1110 according to the estimated age is generally not less than 2, for example, the image sample selecting module 1110 selects a set number (e.g., six) image samples from the image sample set according to the estimated age.

It should be particularly illustrated that the more the number of image samples selected from the image sample set by the image sample selecting module 1110 is, the narrower the width of the peak part of a curve presented by the obtained facial age posterior probability distribution is, so as to improve the accuracy of the estimated age. However, the more the number of image samples selected from the image sample set by the image sample selecting module 1110 is, the longer the time required for determining the comparison result of ages between the image to be identified and the image sample is. The present disclosure can determine the number of image samples selected from the image sample set by equilibrating the efficiency of facial age identification and the accuracy of facial age identification.

In an optional example, at least one image sample selected from the image sample set by the image sample selecting module 1110 should include N1 image samples with the age greater than the estimated age, and should also include N2 image samples with the age less than the estimated age, and the sum of N1 and N2 is N.

In an optional example, in the case that the number of at least one image sample selected from the image sample set by the image sample selecting module 1110 is even, the number N1 of the image samples with the age greater than the estimated age and the number N2 of the image samples with the age less than the estimated age are equal. In addition, for any of the N1 image samples with the age greater than the estimated age, the N2 image samples with the age less than the estimated age should have an image sample of age gaps having the same value and opposite sign, for example, in the case that the image sample selecting module 1110 has to select six images from the image sample set, the image sample selecting module 1110 may select six image samples from the image sample set according to the ages, i.e., the estimated age −10, the estimated age −6, the estimated age −5, the estimated age +10, the estimated age +6, and the estimated age +5 (the corresponding age gaps are −10, −6, −5, 10, 6, and 5, respectively).

In some application scenarios, the case that no image sample conforming to the preset age gap exists in the image sample set would occur; for example, if the estimated age is 4 years old, the image sample selecting module 1110 cannot select corresponding image samples from the image sample set according to a preset image sample selecting strategy of the estimated age −10, the estimated age −6, and the estimated age −5, and at this time, the image sample selecting module 1110 should select (e.g., randomly select) three images of different age gaps from the image samples in the image sample set of the minimum age to the estimated age as much as possible, for example, the image sample selecting module 1110 selects three image samples from the image sample set according to the image sample selecting strategy of the estimated age −3, the estimated age −2, and the estimated age −1; moreover, if the estimated age is 2 years old, the difference between the ages of three image samples selected by the image sample selecting module 1110 and the estimated age will be the same situation. For another example, in the case that the estimated age is 64 years old, and the maximum age of the image sample in the image sample set is 70 years old, the image sample selecting module 1110 cannot select corresponding image samples from the image sample set according to an image sample selecting strategy of the estimated age +10, the estimated age +6, and the estimated age +5, and at this time, the image sample selecting module 1110 should select (e.g., randomly select) three images of different age gaps from the image samples of the estimated age to the maximum age (e.g., 70 years old) as much as possible, for example, the image sample selecting module 1110 selects three image samples from the image sample set according to the image sample selecting strategy of the estimated age +3, the estimated age +2, and the estimated age +1, and if the estimated age is 68 years old, the difference between the ages of three image samples selected by the image sample selecting module 1110 and the estimated age will be the same situation.

The image sample selecting strategy of selecting an image sample from the image sample set by the image sample selecting module 1110 can be flexibly changed according to actual requirements, and the present disclosure does not limit the optional implementation modes of selecting the image sample from the image sample set by the image sample selecting module 1110.

S620, a comparison result of ages between the image to be identified and the selected N image samples is obtained.

In an optional example, step S620 may be executed by a processor by invoking an instruction stored in a memory for obtaining a comparison result of ages between the image to be identified and the selected N image samples, or may be executed by a comparison result obtaining module 1120 run by the processor.

In an optional example, the comparison result obtaining module 1120 may obtain a comparison result of ages between the image to be identified obtained in the form of receiving input information and the selected N image samples, and the comparison result may be a comparison result formed by manually comparing the ages between the image to be identified and the selected N image samples.

In an optional example, the six image samples selected from the image sample set by the image sample selecting module 1110 are shown to a labeling staff, for example, the six image samples selected by the image sample selecting module 1110 is displayed in an image comparison interface; the labeling staff determines whether the person' facial age in the image sample exceeds the person' facial age in the image to be identified for each image sample, and therefore, the labeling staff would provide six determining results, and the comparison result obtaining module 1120 can successfully obtain the comparison result of ages between the image to be identified and the selected six image samples by inputting the six determining result (e.g., the labeling staff clicks corresponding options in the image comparison interface). The present disclosure does not limit the optional implementation modes for obtaining the age comparison result by the comparison result obtaining module 1120.

S630, probability information for determining a person's facial age attribute information is obtained according to statistical information formed by the comparison result, for example, a first facial age posterior probability distribution is obtained according to the preset first facial age prior probability distribution and a first likelihood function formed based on the comparison result.

In an optional example, step S630 in the present disclosure may be executed by a processor by invoking an instruction stored in a memory for obtaining probability information for determining a person's facial age attribute information according to statistical information formed by the comparison result, or may be executed by a probability information generating module 1130 run by the processor; moreover, the probability information (e.g., the facial age posterior probability distribution) generated by the probability information generating module 1130 may be configured to determine a person's facial age attribute information in the image to be identified.

In an optional example, the slope of the first likelihood function in the present disclosure may be any numerical value between 0.1 and 0.6, for example, the slope of the first likelihood function is 0.36.

In an optional example, the probability information generating module 1130 can calculate the first preset facial age prior probability distribution and the first likelihood function formed based on the comparison result according to the Bayes formula to generate the first facial age posterior probability distribution.

In an optional example, the probability information generating module 1130 can generate the first facial age posterior probability distribution by using the formula (3) below:

$$p(\alpha|\{C_{km}\}) \propto P(\alpha)\Pi_{m-1}^{M} P(C_{km}|\alpha) \qquad \text{formula (3)}$$

In the foregoing formula (3), $\alpha$ represents the estimated age; $P(\alpha|\{C_{km}\})$ represents the first facial age posterior probability distribution for the age k of the $m^{th}$ image sample in the case of the estimated age $\alpha$; $P(\alpha)$ represents the first facial age prior probability distribution for the estimated age a, and $P(\alpha)$ may be an uniform probability distribution for at least one age category in the preset age range, e.g., an uniform probability distribution for each integer age in the age range 1-100, or 1-70, or 1-80, etc.; M represents the number of image samples selected from the image sample set; m represents the $m^{th}$ image sample selected from the image sample set; k represents the known age/actual age of the selected image sample; $P(C_{km}|\alpha)$ represents a likelihood value corresponding to the $m^{th}$ image sample based on the known age k in the case of the estimated age a; and $C_{km}$ is a comparison result of the image to be identified and the known age k of the $m^{th}$ image sample.

In the case that $C_{km}=1$ (i.e., the actual age of the $m^{th}$ image sample is greater than the estimated age $\alpha$), the first likelihood function corresponding to $C_{km}$ may be represented in the form of formula (4) below:

$$P(C_{km}|\alpha)=\sigma(\beta(\alpha-k))/Z \qquad \text{formula (4)}$$

In the case that $C_{km}=0$ (i.e., the actual age of the $m^{th}$ image sample is less than the estimated age $\alpha$), the first likelihood function corresponding to $C_{km}$ may be represented in the form of formula (5) below:

$$P(C_{km}|\alpha)=\sigma(\beta(k-\alpha))/Z \qquad \text{formula (5)}$$

In the foregoing formulas (4) and (5), $\sigma(*)$ represents a logistic function, i.e., $\sigma(*)=1/(1+e^{-bx})$, where b is a slope of the logistic function, and the value range of b may be 0.1-0.6, e.g., b=0.36; $\beta$ represents a slope of the first likelihood function, e.g., $\beta=0.36$; $\beta(\alpha-k)$ and $\beta(k-\alpha)$ respectively represent a product of the slope $\beta$ of the first likelihood function and $(\alpha-k)$ and a product of the slope $\beta$ and $(k-\alpha)$; $\beta(k-\alpha)$ and $\beta(\alpha-k)$ may be considered as age gaps of weights; and Z is a coefficient, e.g., $Z=P(E_k-0|\alpha)+P(E_k-1|\alpha)$.

Figure 7:
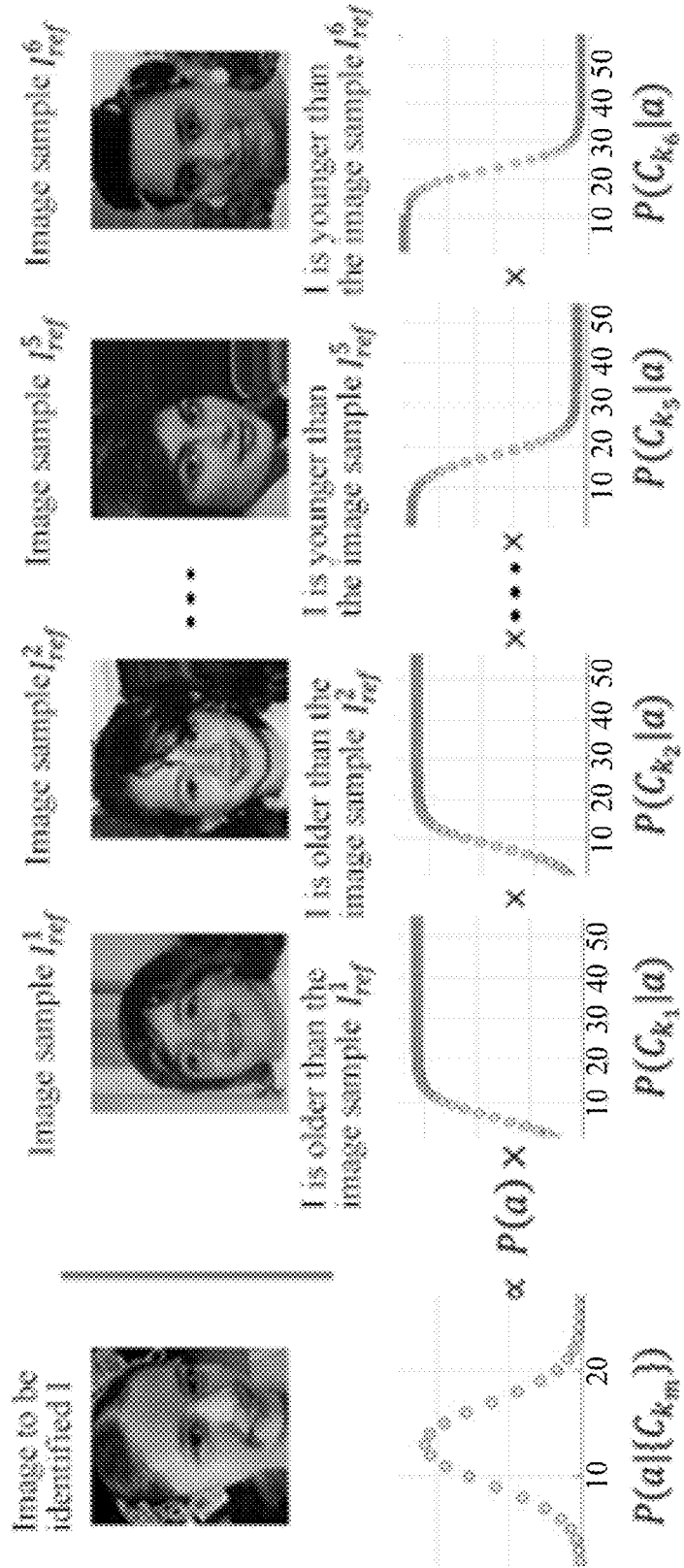
FIG. 7 is a schematic diagram of generating a first facial age posterior probability distribution of the present disclosure.
Figure 8:
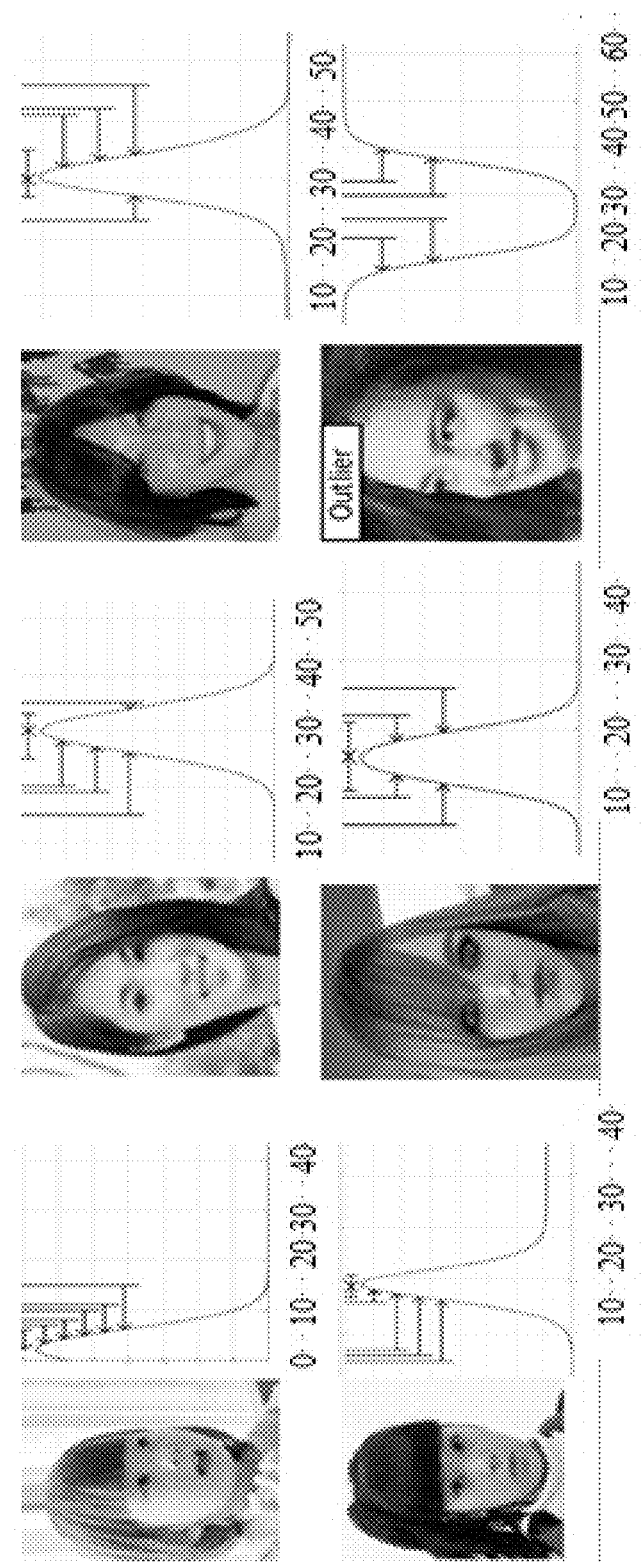
FIG. 8 is a schematic diagram of a first facial age posterior probability distribution of each image to be identified of the present disclosure.

In the case of selecting six image samples from the image sample set, an optional example of the foregoing formula (3) may be as shown in FIG. 7. In FIG. 7, an image at the upper left side is the image to be identified. Due to space and other factors, FIG. 7 merely shows four (e.g., the four images at the upper right side of FIG. 7) of the six image samples selected from the image sample set by the image sample selecting module 1110; moreover, the known ages of two images at the leftmost in the four images are less than the estimated age of the image to be identified, and the known ages of two images at the rightmost in the four images are greater than the estimated age of the image to be identified; the likelihood function separately corresponding to each of the four images at upper right side may be represented as four curve charts at the lower right side of FIG. 7; the probability information generating module 1130 multiplies six likelihood functions by the preset facial age prior probability distribution to obtain the first facial age posterior probability distribution of the image to be identified, and the first facial age posterior probability distribution may be represented as a curve with a peak at the lower left side of FIG. 7.

In an optional example, the probability information generating module 1130 would generate a first facial age posterior probability distribution for the image to be identified; however, in the process that the labeling staff compares the image to be identified and the selected image sample, due to input errors in comparison results or subjective cognitive errors, etc., the phenomenon that the comparison results may be contradictory would occur. For example, when the labeling staff determines the image to be identified and the image sample of the estimated age −6, it is considered that the image to be identified is younger than the image sample; and when the labeling staff determines the image to be identified and the image sample of the estimated age +6, it is considered that the image to be identified is older than the image sample. The existence of contradictory determining results may cause the first facial age posterior probability distribution generated by the probability information generating module 1130 to fail to present a curve with a peak. For example, in FIG. 8, the probability information generating module 1130 generates the first facial age posterior probability distributions for six images to be identified, and the first facial age posterior probability distributions corresponding to five images to be identified are curves with peaks, and the first facial age posterior probability distribution corresponding to the last image to be identified is a parabola with a downward opening; the first facial age posterior probability distribution is an invalid facial age posterior probability distribution; and such first facial age posterior probability distribution should be filtered by a first filtering module 1140 or a corresponding instruction for filtering invalid first facial age posterior probability distribution, i.e., an age attribute determining module 1150 or a corresponding instruction for determining the age attribute information should not use such first facial age posterior probability distribution to determine the person's age attribute information in the image to be identified. The age attribute determining module 1150 determines the person's facial age attribute information according to valid first facial age posterior probability distribution, and a labeling module 1160 or an instruction for labeling the age attribute information of the image to be identified labels the image to be identified. For an optional implementation mode of determining the person's age attribute information by the age attribute determining module 1150 according to valid first facial age posterior probability distribution, reference can be made to the optional implementation mode of determining the estimated age of the image to be identified by the estimated age obtaining module 1100 according to a facial age posterior probability distribution output by the neural network model, and details are not described herein again.

In an optional example, the training process of the neural network model in the present disclosure may be executed by a processor by invoking an instruction stored in a memory for training the neural network model, or may be executed by a training module 1240 run by the processor; moreover, the training process of the neural network model may include the following operations.

Figure 9:
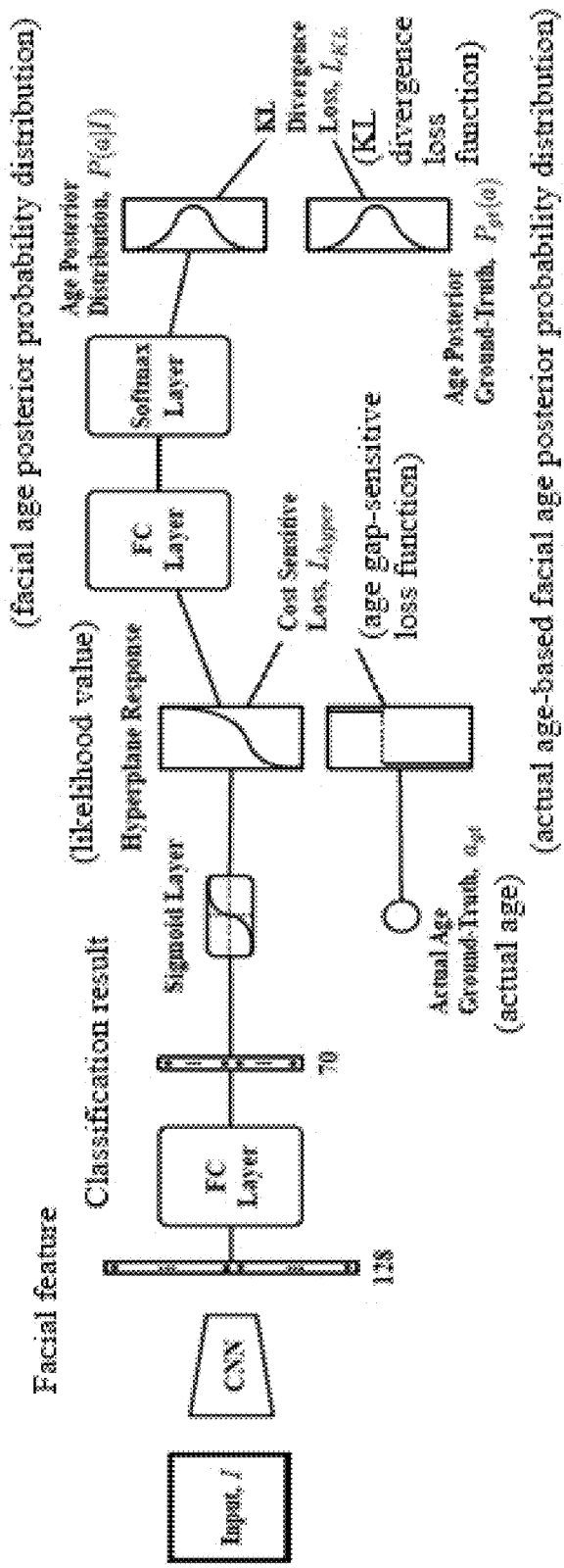
FIG. 9 is a schematic diagram of a neural network model of the present disclosure.

As shown in FIG. 9, the neural network model in the present disclosure is set to include a CNN, a first fully connected layer, a sigmoid layer, a second fully connected layer, and a softmax layer; moreover, the image sample set in the present disclosure is provided with multiple image samples. In general, each image sample should contain a face, and the faces in the image samples may be positive faces, or may be deflected by at least one angle. In addition, the clarity of face in the image sample may be very good, or may be defective to certain extent. Moreover, at least one image sample in the image sample set is generally an image sample of known age, for example, all the image samples in the image sample set are generally labeled with the actual ages.

First, the training module 1240 selects an image sample from the image sample set to be input to the neural network model as an input image sample; the CNN in the neural network model obtains a person's facial features in the image sample, so that the CNN outputs facial features of certain dimensions, for example, the CNN outputs 128-dimensional facial features. In addition, the training module 1240 should select M image samples (illustrated by taking six image samples as an example below) of known facial age from the image sample set according to the known facial age of the input image sample and the facial age of two or more preset age gaps with the known facial age (illustrated by taking six age gaps as an example below).

Secondly, the first fully connected layer and the sigmoid layer in the neural network model classify the facial features output by the CNN for each integer age in the preset age range (e.g., 1-70), so that the sigmoid layer outputs the probability value of the person in the input image sample exceeding each integer year, for example, for 1-70 years old, the sigmoid layer outputs a probability value of a person over 1 year old, a probability value over 2 years old, a probability value over 3 years old, . . . and a probability value over 70 years old in an input image sample, these 70 probability values form a 70-dimensional likelihood value, such as hyperplane response in FIG. 9.

Thirdly, the second fully connected layer and the softmax layer in the neural network model calculate, by using the Bayes formula, a second preset facial age prior probability distribution and a third likelihood function formed by the foregoing likelihood function, so that the softmax layer outputs a third facial age posterior probability distribution, where at least one parameter in the second fully connected layer is determined according to the slope of the third likelihood function, and the slope of the third likelihood function may be a numerical value between 0.1 and 0.6, e.g., the slope of the third likelihood function is 0.36.

Finally, the training module 1240 can form an actual third facial age posterior probability distribution by the foregoing selected six image samples and the foregoing input image samples, and make, by using the third facial age posterior probability distribution, the neural network model to perform supervised learning. Optionally, the training module 1240 can provide the second facial age posterior probability distribution and the third facial age posterior probability distribution to the loss function, so as to implement supervised learning based on facial age posterior probability distribution. The foregoing third facial age posterior probability distribution should be valid third facial age posterior probability distribution filtered by the second filtering module 1230 or corresponding instruction for filtering invalid third facial age posterior probability distribution, i.e., the training module 1240 should not perform supervised learning with such third facial age posterior probability distribution.

The loss function may be shown as formula (6) below:

$$L_{KL}=D_{KL}(P_{gt}(\alpha)\| (\alpha|I))=-\Sigma_{\alpha}P_{gt}(\alpha)\log P(\alpha|I)-\text{Const} \quad \text{formula (6)}$$

In the foregoing formula (6), $L_{KL}$ represents the loss function; $D_{KL}(*)$ represents cross entropy loss; $\alpha$ is the actual age of the input image sample; $P_{gt}(\alpha)$ represents the third facial age posterior probability distribution; $P(\alpha|I)$ represents the second facial age posterior probability distribution; and Const is a constant value.

Since the facial age posterior probability distribution generally contains more information with respect to a specific age or age range, the facial age posterior probability distribution is used to perform supervised learning on the neural network model, and thus, the neural network model generally learns more content, so that the facial age posterior probability distribution output by the successfully trained neural network model is closer to the actual facial age posterior probability distribution. By using such facial age posterior probability distribution to perform age estimation/prediction, the accuracy of age estimation/prediction can be improved.

In addition, since the input image sample is labeled with the actual age, the training module 1240 can also perform supervised learning on the neural network model by using the comparison result (i.e., the likelihood value) between the actual age and the actual age of the selected image sample. Optionally, the training module 1240 may separately provide the comparison result between the actual age and the actual age of the selected image sample and the likelihood value output based on the first fully connected layer and the sigmoid layer, so as to achieve supervised learning of the actual age. The loss function may be shown as formula (7) below:

$$L_{hyper} = \Sigma_k \cos t_k(\alpha_{gt}) \| f_k(I) - 1[\alpha_{gt} > k] \|_2^2 \qquad \text{formula (7)}$$

In the foregoing formula (7), a $\text{Cost}_k(\alpha_{gt})$ function may be defined as: if $|\alpha_{gt} - k| < L$, the function value is 0, otherwise, the function value is 1; k represents the $k^{th}$ classifier in the first fully connected layer, and k may also be understood as k years old; L may be set as 3; $f_k(I) = \langle w_k, \phi(I) \rangle$, $w_k$ is a weight for the $k^{th}$ classifier in the first fully connected layer and the sigmoid layer; $\phi(I)$ represents the facial features of the input image sample, i.e., a facial feature vector; and $\alpha_{gt}$ is a person's actual age in the input image sample.

Figure 10:
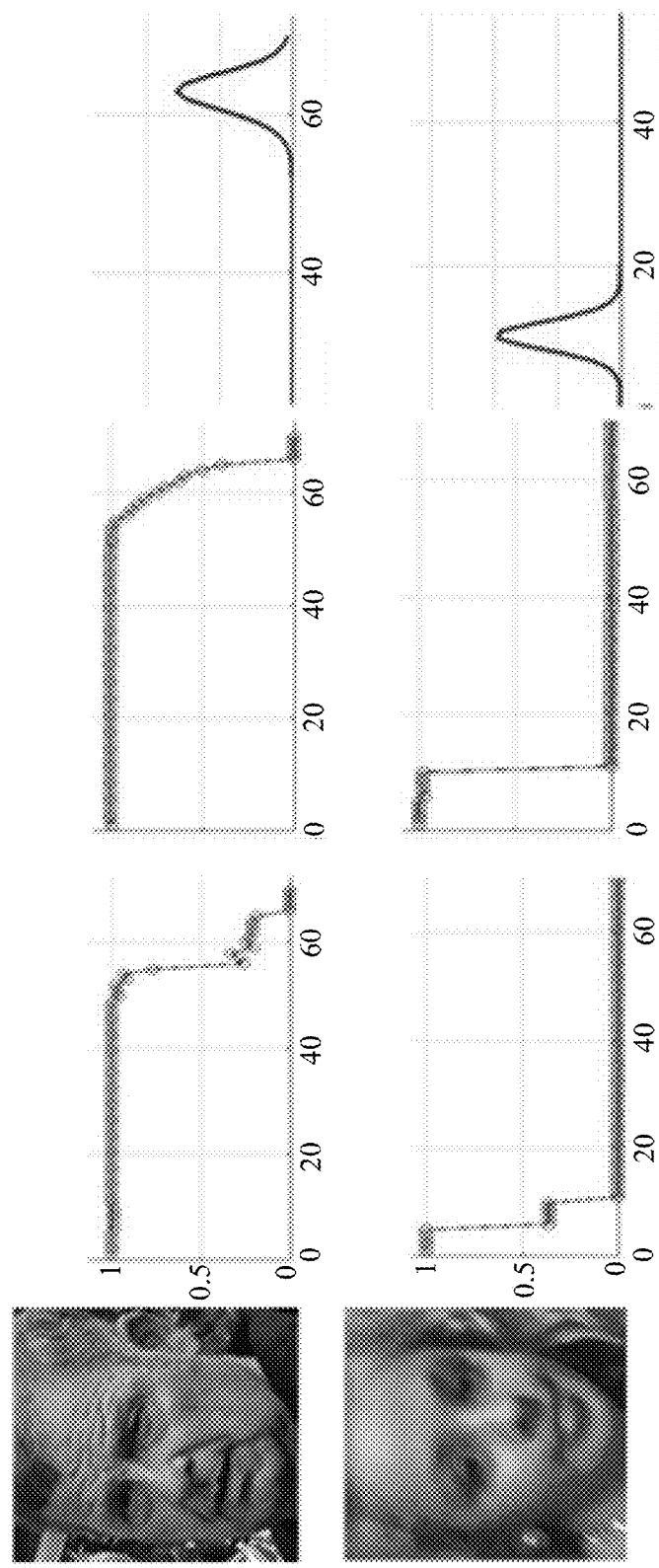
FIG. 10 is a schematic diagram of a likelihood function and a facial age posterior probability distribution respectively corresponding to two image samples of the present disclosure.
Figure 11:
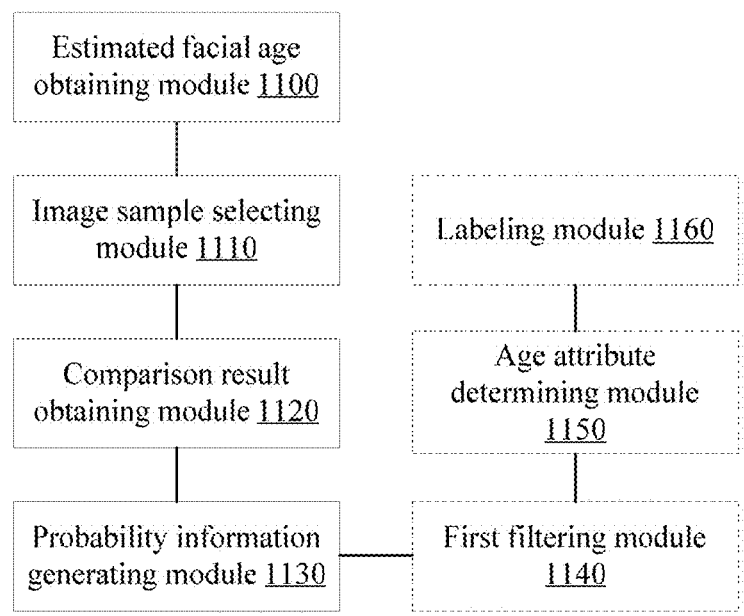
FIG. 11 is a schematic structural diagram of an embodiment of the apparatus of the present disclosure.
Figure 12:
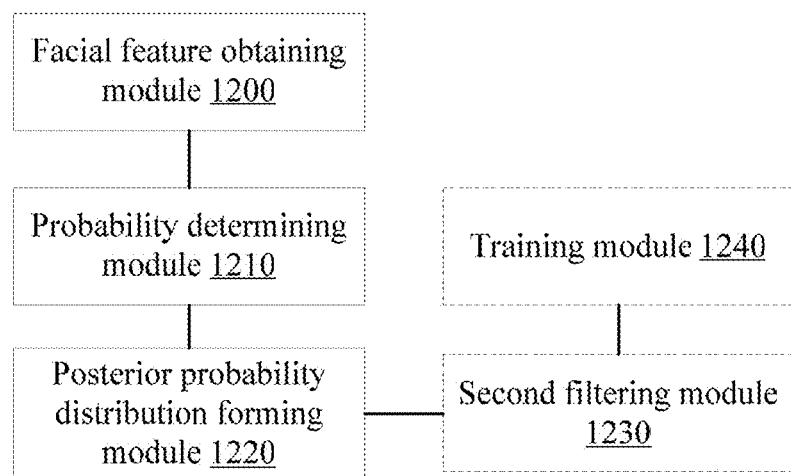
FIG. 12 is a schematic structural diagram of another embodiment of the apparatus of the present disclosure.

The present disclosure performs supervised learning on the neural network model by using the comparison result (i.e., the likelihood value) between the actual age of the input image sample and the actual age of the selected image sample, and it is beneficial to improve the accuracy of the likelihood value formed by the neural network model, so that the facial age posterior probability distribution formed by the second fully connected layer and the softmax layer is closer to the actual facial age posterior probability distribution. After the training module 1240 trains the neural network model, the likelihood function formed by the neural network model for the upper and lower input image samples on the leftmost side of FIG. 10 can be shown as the upper and lower curve charts shown in the middle position of FIG. 10; moreover, the actual likelihood function of the upper and lower input image samples on the leftmost side of FIG. 10 can be shown as the upper and lower curve charts on the leftmost side of FIG. 10, and the facial age posterior probability distribution finally formed by the neural network model can be shown as the upper and lower curve charts on the rightmost side of FIG. 10. It can be known from FIG. 10 that although the face in an input image sample on the upper leftmost side in FIG. 10 has a certain rotation angle, and the face in an input image sample on the lower leftmost side in FIG. 10 is vague, if the person's facial age in the two input image samples is estimated with the facial age posterior probability distribution output by the neural network model, the person's facial age can be basically matched with the person's actual age in the input image sample.

An electronic device provided according to another aspect of the embodiments of the present disclosure includes: a processor and the apparatus for facial age identification according to any one of the foregoing embodiments, where when the processor runs the apparatus for facial age identification, modules in the apparatus for facial age identification according to any one of the foregoing embodiments are run; or a processor and the apparatus for facial age identification according to any one of the foregoing embodiments, where when the processor runs the apparatus for facial age identification, modules in the apparatus for facial age identification according to any one of the foregoing embodiments are run.

A computer readable storage medium provided according to another aspect of the embodiments of the present disclosure has a computer program stored thereon, where the computer program is executed by a processor to implement the method for facial age identification according to any one of the foregoing embodiments.

A computer program provided according to another aspect of the embodiments of the present disclosure includes a computer readable code, where when the computer readable code runs in a device, a processor in the device executes instructions for implementing steps of the method for facial age identification according to any one of the foregoing embodiments; or when the computer readable code runs in a device, a processor in the device executes instructions for implementing steps of the method for facial age identification according to any one of the foregoing embodiments.

Various embodiments in this description are described in a progressive manner, emphasized descriptions of each embodiment may include a difference between this embodiment and another embodiment, and same or similar parts between the embodiments may be cross-referenced. For the system embodiment, since the system embodiment basically corresponds to the method embodiment, the description is relatively simple. For related parts, refer to related descriptions of the method embodiment.

The methods and the apparatuses of the present disclosure may be implemented in many manners. For example, the methods and apparatuses of the present disclosure may be implemented by using software, hardware, firmware, or any combination of software, hardware, and firmware. Unless otherwise specially stated, the foregoing sequences of steps of the methods are merely for description, and are not intended to limit the steps of the methods of the present disclosure. In addition, in some embodiments, the present disclosure may be implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A method for facial age identification, comprising:
   obtaining estimated facial age of a person in an image to be identified;

selecting N image samples from an image sample set of known age according to the estimated facial age and age of two or more preset age gaps with the estimated facial age, N being not less than 2;

obtaining a comparison result between the estimated facial age for the image to be identified and a known age of each of the selected N image samples; and obtaining probability information for determining the person's facial age attribute information according to statistical information formed by the comparison result, wherein the obtaining estimated facial age of a person in an image to be identified comprises:

inputting the image to be identified to a neural network model, and determining estimated facial age of the person in the image to be identified according to output information of the neural network model, wherein the output information of the neural network model comprises a second facial age posterior probability distribution, wherein processing operations executed by the neural network model for the input image to be identified comprise:

obtaining a person's facial features in the image to be identified;

determining, for at least one preset age category, the probability that the facial features are facial features exceeding the age category, the probability forming a likelihood value of a second likelihood function; and generating a second facial age posterior probability distribution according to a second preset facial age prior probability distribution and the second likelihood function formed based on the probability.

2. The method according to claim 1, wherein the obtaining probability information for determining a person's facial age attribute information according to statistical information formed by the comparison result comprises:

obtaining a first facial age posterior probability distribution according to a first preset facial age prior probability distribution and a first likelihood function formed based on the comparison result;

wherein the facial age posterior probability distribution is configured to determine a person's facial age attribute information.

3. The method according to claim 1, wherein the determining, for at least one preset age category, the probability that the facial features are facial features exceeding the age category comprises:

classifying the facial features by using a first fully connected layer for the at least one preset age category; and performing normalization processing on the classification result by using a sigmoid function to obtain the probability that the facial features are facial features exceeding the age category.

4. The method according to claim 1, wherein the generating a second facial age posterior probability distribution according to a second preset facial age prior probability distribution and the second likelihood function formed based on the probability comprises:

calculating the second preset facial age prior probability distribution and the second likelihood function formed based on the probability according to the Bayes formula to generate the second facial age posterior probability distribution.

5. The method according to claim 4, wherein the calculating the second preset facial age prior probability distribution and the second likelihood function formed based on the probability according to the Bayes formula to generate the second facial age posterior probability distribution comprises:

calculating the second preset facial age prior probability distribution and the second likelihood function formed based on the probability by using a second fully connected layer according to the logged Bayes formula; and restoring a calculation result output by the second fully connected layer to the second facial age posterior probability distribution by using a softmax function.

6. The method according to claim 1, wherein the determining estimated facial age of the person in the image to be identified according to output information of the neural network model comprises:

determining a median of the second facial age posterior probability distribution, and using the median as the estimated facial age; or performing weighted calculation on the second facial age posterior probability distribution, and determining the estimated facial age according to the weighted calculation result; or using the age corresponding to the maximum probability in the second facial age posterior probability distribution as the estimated facial age; or performing confidence calculation on the second facial age posterior probability distribution, and determining an age range according to the confidence calculation result, and selecting an age from the age range as the estimated facial age.

7. The method according to claim 1, wherein the N sample images comprise N1 image samples with the age greater than the estimated facial age and N2 image samples with the age less than the estimated facial age, wherein the sum of N1 and N2 is N.

8. The method according to claim 7, wherein when N is even, the N1 and N2 are equal, and for any one of the N1 image samples that is with the age greater than the estimated facial age by a preset age gap, the N2 image samples with the age less than the estimated facial age have an image sample with an age less than the estimated facial age by the preset age gap.

9. The method according to claim 1, wherein the obtaining a comparison result of ages between the image to be identified and the selected N image samples comprises:

obtaining the comparison result of ages between the image to be identified obtained in the form of receiving input information and the selected N image samples;

wherein the input information comprises a comparison result formed by manually comparing the ages between the image to be identified and the selected N image samples.

10. The method according to claim 2, wherein the obtaining a first facial age posterior probability distribution according to a first preset facial age prior probability distribution and a first likelihood function formed based on the comparison result comprises:

calculating the first preset facial age prior probability distribution and the first likelihood function formed based on the comparison result according to the Bayes formula to generate the first facial age posterior probability distribution.

11. The method according to claim 2, wherein the first facial age prior probability distribution comprises a uniform probability distribution for at least one preset age category.

12. The method according to claim 2, further comprising:
filtering invalid first facial age posterior probability distribution;
wherein the invalid first facial age posterior probability distribution comprises: forming a first facial age posterior probability distribution of a downward parabolic shape.

13. The method according to claim 2, further comprising:
determining a person's facial age attribute information according to the first facial age posterior probability distribution; and
labeling age attribute information of the image to be identified according to the facial age attribute information.

14. The method according to claim 13, wherein the determining a person's facial age attribute information according to the first facial age posterior probability distribution comprises:
determining a median of the first facial age posterior probability distribution, and using the median as the facial age of the image to be identified; or
performing weighted calculation on the first facial age posterior probability distribution, and determining the facial age of the image to be identified according to a weighted calculation result; or
using the age corresponding to the maximum probability in the first facial age posterior probability distribution as the facial age of the image to be identified; or
performing confidence calculation on the second facial age posterior probability distribution, and determining an age range to which the facial age of the image to be identified belongs according to a confidence calculation result.

15. The method according to claim 2, wherein a slope of the first likelihood function and/or the second likelihood function is a numerical value between 0.1 and 0.6.

16. An apparatus for facial age identification, comprising:
memory storing processor-executable instructions; and
a processor arranged to execute the stored processor-executable instructions to perform operations of:
obtaining estimated facial age of a person in an image to be identified;
selecting N image samples from an image sample set of known age according to the estimated facial age and age of two or more preset age gaps with the estimated facial age, the N being not less than 2;
obtaining a comparison result between the estimated facial age for the image to be identified and a known age of each of the selected N image samples; and
obtaining probability information for determining a person's facial age attribute information according to statistical information formed by the comparison result,
wherein the obtaining estimated facial age of a person in an image to be identified comprises:
inputting the image to be identified to a neural network model, and determining estimated facial age of the person in the image to be identified according to output information of the neural network model,
wherein the output information of the neural network model comprises a second facial age posterior probability distribution,
wherein processing operations executed by the neural network model for the input image to be identified comprise:
obtaining a person's facial features in the image to be identified;
determining, for at least one preset age category, the probability that the facial features are facial features exceeding the age category, the probability forming a likelihood value of a second likelihood function; and
generating a second facial age posterior probability distribution according to a second preset facial age prior probability distribution and the second likelihood function formed based on the probability.

17. A non-transitory computer readable storage medium, having a computer program stored thereon, wherein the computer program is executed by a processor to implement a facial age identification method, the method comprising:
obtaining estimated facial age of a person in the image to be identified;
selecting N image samples from an image sample set of known age according to the estimated facial age and age of two or more preset age gaps with the estimated facial age, N being not less than 2;
obtaining a comparison result between the estimated facial age for the image to be identified and a known age of each of the selected N image samples; and
obtaining probability information for determining the person's facial age attribute information according to statistical information formed by the comparison result,
wherein the obtaining estimated facial age of a person in an image to be identified comprises:
inputting the image to be identified to a neural network model, and determining estimated facial age of the person in the image to be identified according to output information of the neural network model,
wherein the output information of the neural network model comprises a second facial age posterior probability distribution,
wherein processing operations executed by the neural network model for the input image to be identified comprise:
obtaining a person's facial features in the image to be identified;
determining, for at least one preset age category, the probability that the facial features are facial features exceeding the age category, the probability forming a likelihood value of a second likelihood function; and
generating a second facial age posterior probability distribution according to a second preset facial age prior probability distribution and the second likelihood function formed based on the probability.

18. The apparatus according to claim 16, wherein the obtaining probability information for determining a person's facial age attribute information according to statistical information formed by the comparison result comprises:
obtaining a first facial age posterior probability distribution according to a first preset facial age prior probability distribution and a first likelihood function formed based on the comparison result;
wherein the facial age posterior probability distribution is configured to determine a person's facial age attribute information.

19. The apparatus according to claim 16, wherein the determining, for at least one preset age category, the probability that the facial features are facial features exceeding the age category comprises:
classifying the facial features by using a first fully connected layer for the at least one preset age category; and
performing normalization processing on the classification result by using a sigmoid function to obtain the probability that the facial features are facial features exceeding the age category.

20. The non-transitory computer readable storage medium according to claim 17, wherein the obtaining probability information for determining a person's facial age attribute information according to statistical information formed by the comparison result comprises:

obtaining a first facial age posterior probability distribution according to a first preset facial age prior probability distribution and a first likelihood function formed based on the comparison result;

wherein the facial age posterior probability distribution is configured to determine a person's facial age attribute information.

* * * * *